Feb. 4, 1969

J. E. ERHARDT ETAL
CONVEYOR SYSTEM

Filed July 3, 1967

INVENTORS.
JOHN E. ERHARDT
KENNETH S. HIRTLE
HARRY F. OSTERMAN
BY:
Erwin A. Steinberg

INVENTORS.
JOHN E. ERHARDT
KENNETH S. HIRTLE
HARRY F. OSTERMAN
BY:

INVENTORS.
JOHN E. ERHARDT
KENNETH S. HIRTLE
HARRY F. OSTERMAN

BY:

INVENTORS.
JOHN E. ERHARDT
KENNETH S. HIRTLE
HARRY F. OSTERMAN

3,425,533
Patented Feb. 4, 1969

3,425,533
CONVEYOR SYSTEM
John E. Erhardt, Baltimore, Md., Kenneth S. Hirtle, Westfield, N.J., and Harry F. Osterman, Stamford, Conn., assignors to Branson Instruments Incorporated, Stamford, Conn., a corporation of Delaware
Filed July 3, 1967, Ser. No. 650,867
U.S. Cl. 198—19
Int. Cl. B65g 23/00, 15/04

14 Claims

ABSTRACT OF THE DISCLOSURE

A conveyor for transferring workpieces through a series of juxtaposed stations or processing tanks. The conveyor is mounted for being lifted cyclically in a vertical direction and cam means are provided for indexing a workpiece in a horizontal direction during the last part of the upward motion. Upon completion of the upward motion, using for instance a linear actuator, the conveyor and workpiece are returned to their work position. A single motive means is used to provide the motion along the vertical and horizontal axes.

---

Figure 1:
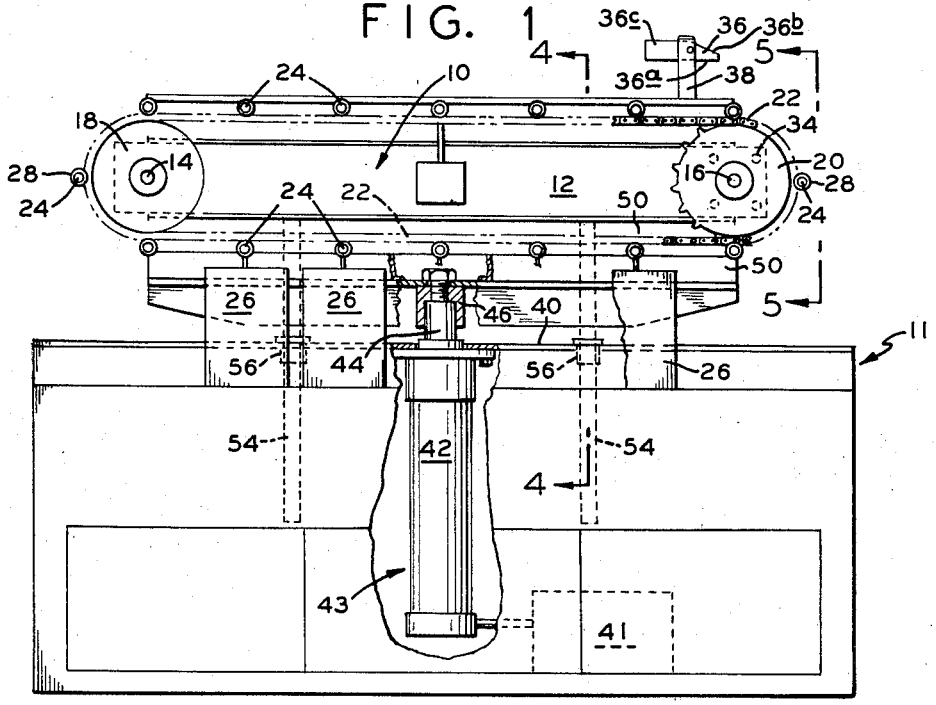

This invention relates generally to a conveyor system for moving workpieces along juxtaposed work stations and refers, more particularly, to a conveyor system for transporting a workpiece incrementally along a generally horizontal axis along which a plurality of work stations are disposed, while moving such a workpiece also along a generally vertical axis toward and away from work stations. Quite specifically, this invention concerns a conveyor system having an endless band for moving workpieces sequentially in and out of a series of juxtaposed processing tanks, the motion being provided by a motive means which cyclically imparts to the system a reciprocating movement along a vertical axis, and a means disposed for converting such vertical motion to incremental horizontal motion, whereby a workpiece is advanced in step-by-step fashion from one work station to an adjacent work station.

In processing workpieces, such as in cleaning, degreasing, painting, etc. it is required frequently that workpieces be subjected sequentially to different liquids, such as various solvents and water rinses. Generally, a plurality of tanks are disposed in a line and a conveyor system conveys such workpieces from one processing tank to the next. In order to immerse the workpieces into the liquid contained in the respective tanks, the conveyor track is generally provided with peaks and valleys so that the workpiece is alternately raised and lowered along its travel. A conveyor of this type requires that the tanks be elongated or spread out in order to provide for the vertical travel of the workpiece along the conveyor track, permitting the workpiece to emerge from a particular liquid and attain sufficient vertical clearance while being advanced from one tank to the succeeding one.

The improved system described hereafter permits processing tanks to be arranged in close proximity to each other and describes a conveyor system mounted to a movable support which is cyclically moved in a vertical direction relative to the processing tanks while suspended workpieces concomitantly are indexed to the conveyor along a generally horizontal axis in order to provide for the advance of a workpiece from one work station to the next one. In addition, a single reciprocating motive means is used to provide for the motion of the conveyor and workpieces along generally two axes.

One of the principal objects of this invention is, therefore, the provision of a new and improved conveyor system.

Another principal object of this invention is the provision of a conveyor system which permits a plurality of processing tanks to be arranged in close proximity to each other, thereby providing a very compact and space saving processing line.

A further object of this invention is the provision of a conveyor system which is mounted upon a movable support for cyclic vertical reciprocating motion relative to stationary work places, and which includes an endless conveyor band which incrementally is moved about a set of spaced wheels during the time the movable support moves through its reciprocating motion.

Another object of this invention is the provision of a conveyor system which uses a single motive means for providing substantially vertical and horizontal transfer of a workpiece from one work station to another work station.

Figure 2:
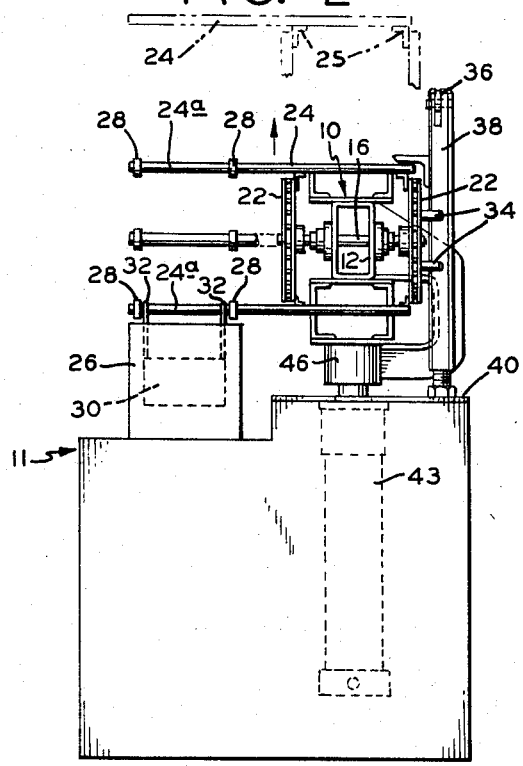
Figure 11:
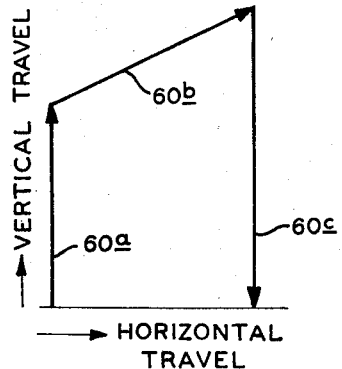
Figure 3:
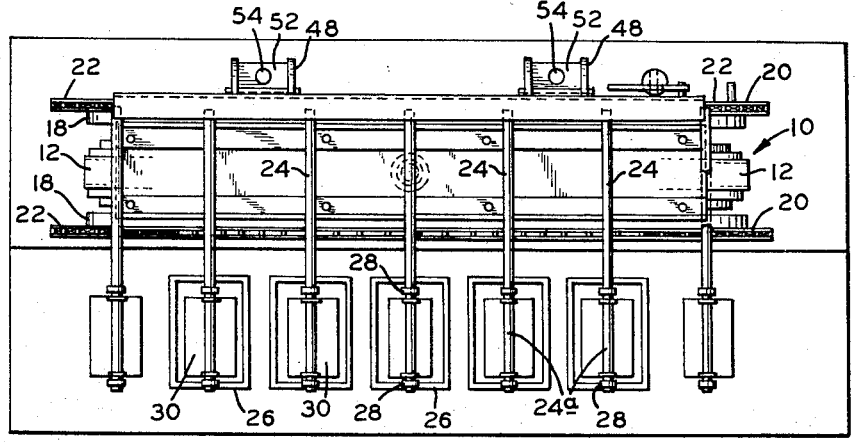
Figure 4:
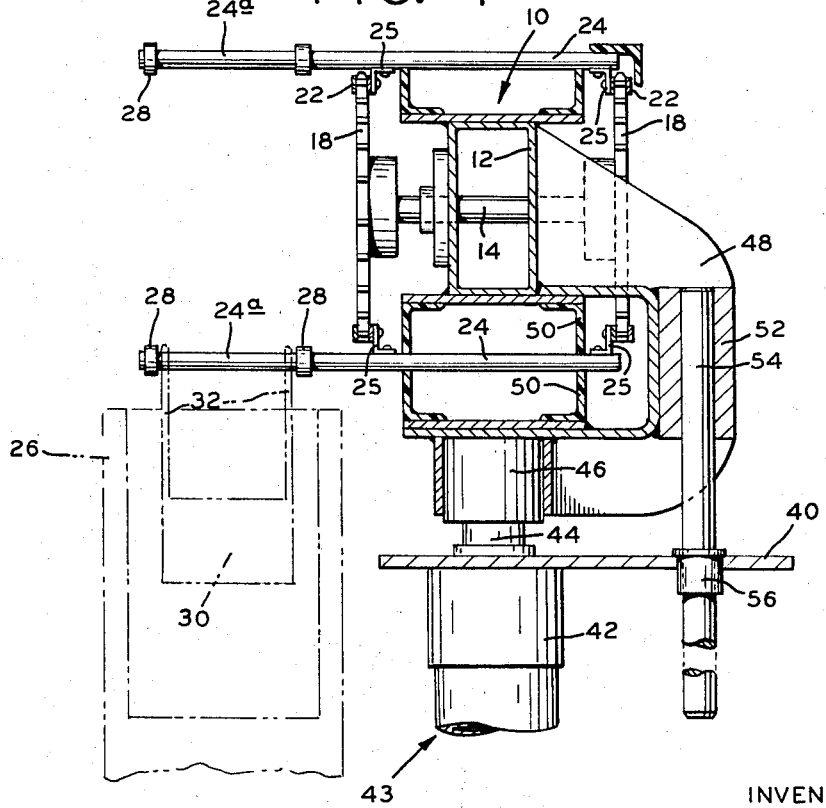
Figure 5:
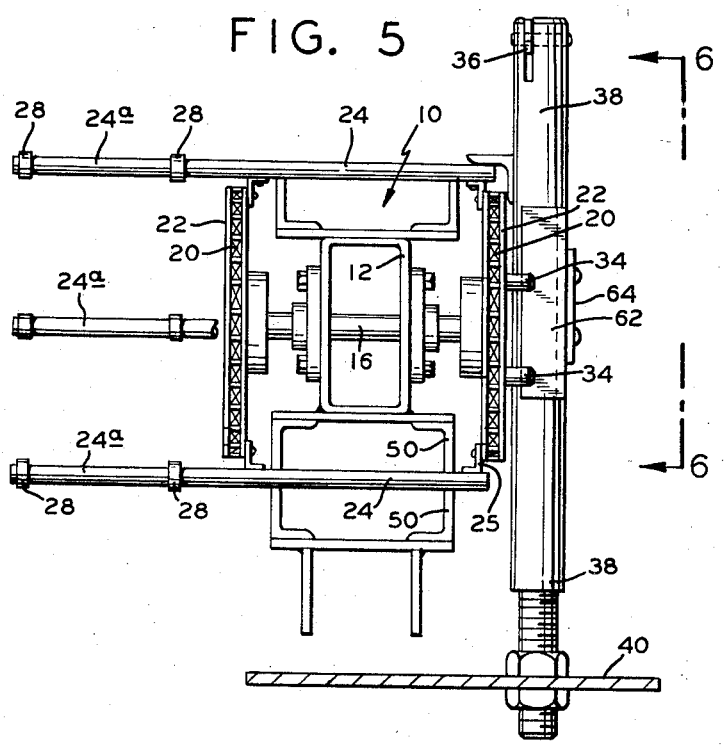
Figure 6:
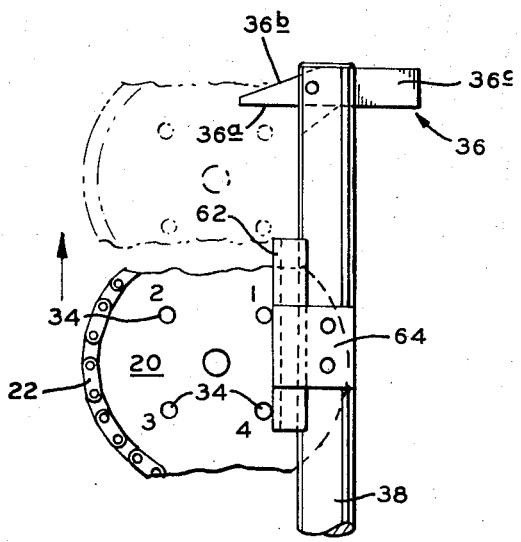
Figure 7:
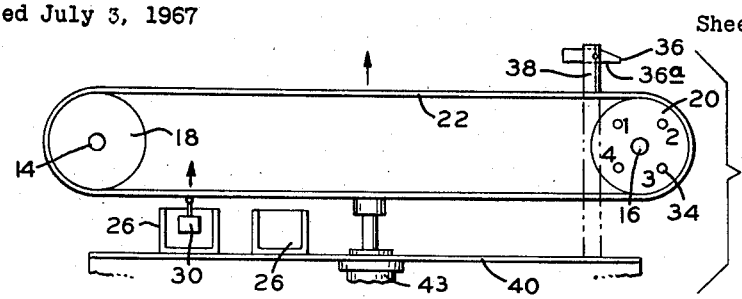
Figure 8:
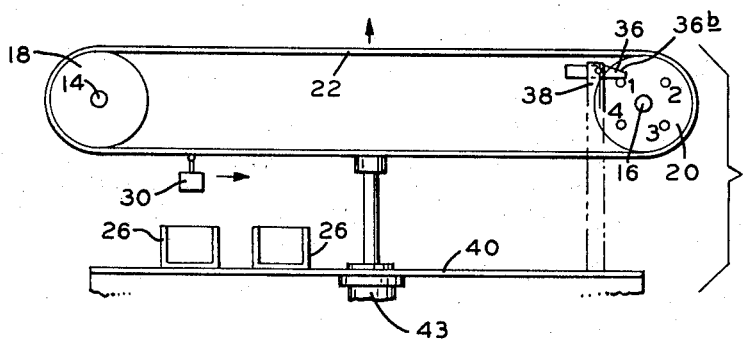

Further and still other objects of this invention will be more clearly apparent by reference to the following description when taken in conjunction with the accompanying drawings in which:

FIGURE 1 is a front elevational view of the conveyor system;
FIGURE 2 is a right side elevational view;
FIGURE 3 is a top plan view;
FIGURE 4 is a sectional view taken along line 4—4 in FIGURE 1;
FIGURE 5 is an end view taken along line 5—5 in FIGURE 1;
FIGURE 6 is a view taken along the line 6—6 of FIGURE 5;
FIGURES 7 through 10 are schematic motion views illustrating the travel of a workpiece through one cycle and illustrating the cam means for effecting such motion, and
FIGURE 11 is a schematic diagram showing the motion vectors as the workpiece travels from one work station to the next one.

Referring now to the figures and FIGURES 1 through 5 in particular, there is shown a support means 10 which is adapted to move along a generally vertical axis relative to a stationary work station 11, see FIGURES 1 and 2. The support means 10 supports a conveyor system for transporting workpieces along the length of the work station 11 and comprises, as its main element, a rectangular, horizontally disposed tubing 12 in which a horizontal shaft 14 is journalled adjacent the left end, and a second horizontal shaft 16 is journalled adjacent the right end, see FIGURE 1. Two sprocket gears 18 are mounted upon the shaft 14 in spaced relation and similarly, two sprocket gears 20 are secured upon the shaft 16 as clearly seen in FIGURES 1 and 3. A pair of parallel endless sprocket chains 22 extend between the the respective sprockets 18 and 20. A plurality of rods 24, adapted to act as carriers for workpieces, are fastened in spaced relation to the chains 22 by means of angle brackets 25 and suitable fastening means. The rods extend outwardly in a horizontal direction along an axis which is substantially normal to the travel of the chains. Each rod 24 has an overhanging forward portion 24a which overhangs the work station 11 and the plurality of juxtaposed processing tanks 26 which are positioned along the work station. Each overhanging portion 24a is provided with a set of spaced collars 28, FIGURES 2, 4 and 5, to position a basket 30 or a workpiece which is hung upon the overhanging rod portion 24a by suitable straps 32 in a manner to cause the workpiece or basket to depend into a respective processing tank 26 disposed underneath.

One of the sprocket gears 20, right rear, is provided with four projecting pins or cam followers 34 numbered 1, 2 3, and 4 (FIGURES 1, 2 and 5) which are positioned in the side of the sprocket gear in proper circumferential position to cooperate with a stationary trigger arm 36 which is mounted for limited pivotal motion in a stationary vertical rod 38 adjacent the sprocket 20 and extending from the stationary support means 40. The pins and the trigger arm constitute means for converting linear motion to rotational motion, specifically to rotate the sprocket gear 22 through increments of 90 degrees. The rotational movement of the sprocket gear 20 and the attendant incremental advance of the sprocket chains is accomplished by the reciprocating movement of a respective cam follower 34 against the underside 36a of the trigger arm 36, FIGURE 1. A linear motion actuator 43, which typically is of the pneumatic or hydraulic type and which is controlled by a timing device 41, is fastened with its cylinder 42 to the stationary support plate 40, while its movable piston rod 44 is secured in a boss 46 disposed on the bottom of the movable conveyor support 10, see FIGURES 2 and 4. A pair of flange brackets 48 (FIGURES 3 and 4) serve to support the tubing 12 above the boss 46 in a manner permitting the workpiece supporting rods 24 to pass therebetween, slidingly supported between the U-shaped guide rails 50.

A boss 52 is secured within each of the brackets 48 for supporting therein a vertical guide rod 54 which is mounted for sliding motion within the sleeve 56 disposed within the stationary support plate 40. The rods 54 and sleeves 56 guide the conveyor structure during its vertical reciprocating motion responsive to the actuation of the actuator 43 and maintain the conveyor structure aligned relative to the work station 11 and the tanks 26.

Figure 9:
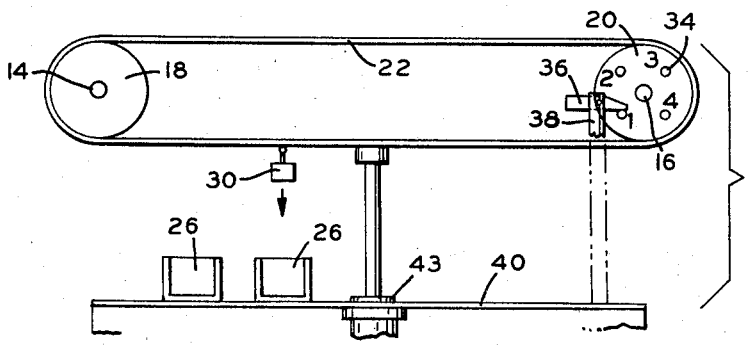
Figure 10:
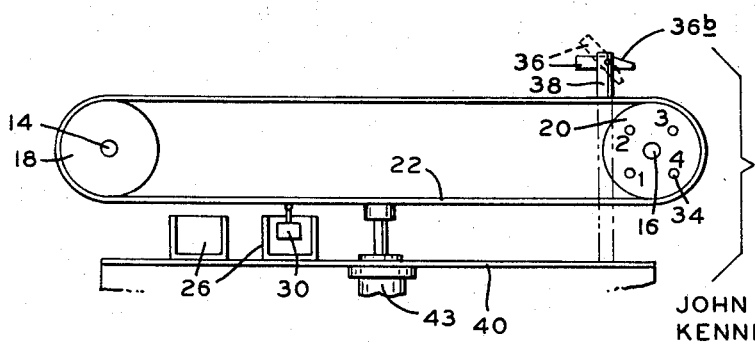

The motion of the conveyor in vertical direction and the indexing of the sprocket chain is illustrated quite clearly in FIGURES 7, 8, 9 and 10. The timing device 41 which, for instance, contains a timing cam, cyclically causes the actuator 43 to go through a reciprocating motion, i.e. lifting and lowering the conveyor support 10 relative to the work station 11. When the piston rod 44 is extended upward responsive to the admittance of fluid in the cylinder 42, the conveyor support means 10 is raised causing one of the cam followers 34 (No. 1), which is mounted in the side of the sprocket gear 20, to be brought in contact with and strike against the lower cam surface 36a of the trigger arm 36, see FIGURES 7 and 8. As the conveyor support and the sprocket continue along their upward motion, the No. 1 cam follower remains in contact with the surface 36a and, not being able to continue along a vertical motion, a 90° rotation of the gear in counterclockwise rotation is caused, as seen in FIGURE 9. FIGURE 9 represents the fully raised conveyor position. As the conveyor support is lowered by reversing the direction of travel of the piston 44, the cam follower No. 2, see FIGURE 9, strikes the inclined upper cam surface 36b of the trigger arm, thereby tilting the trigger arm 36 into the dotted position shown in FIGURE 10, thus permitting the No. 2 cam follower to pass and assume the angular and elevational position originally assumed by the No. 1 follower. The trigger arm 36 has a weighted overhang 36c which restores the trigger arm to its horizontal position as soon as the No. 2 cam follower has cleared the trigger arm. FIGURE 10 represents the condition when the conveyor has resumed its fully lowered position. As seen from these figures, a basket or workpiece 30 is first lifted out of a tank 26 (FIGURES 7 and 8), when it has cleared a tank is moved toward the right, i.e. advanced toward the next work station (FIGURE 9) and then lowered into the next cleaning tank 26. As is apparent, this motion of the conveyor system enables the very close spacing of work stations and of treatment tanks. It will be obvious that the diameter of the cam follower circle must be correlated with the work station in such a manner that each 90 degree rotation of the sprocket gear 20 advances a workpiece 30 from one tank 26 to the next one.

The vertical and horizontal motion of a workpiece suspended from the conveyor rod 28 is illustrated also in FIGURE 11. During the first part of the conveyor motion, the workpiece moves straight vertically as represented by the vector 60a. Next, as the vertical conveyor motion still continues, the workpiece having cleared the tank, horizontal motion caused by the rotation of the sprocket gear 20 occurs, thus providing the combined vertical and horizontal motion as represented by the vector 60b. This motion moves the workpiece above the next tank. Subsequently the conveyor support is lowered, providing straight downward motion of the workpiece as represented by the vector 60c.

A locking arrangement prevents motion of the workpiece along the horizontal axis (motion of the sprocket chains 22) when the conveyor is in the lowered position. As seen in FIGURES 5 and 6, a U-shaped channel 62 is fastened to the stationary rod 38 by a plate 64. While the conveyor is in the lowered position two of the cam followers 34, such as 1 and 4 in FIGURES 5 and 6, abut the channel and, thus, block motion along the horizontal axis. As the conveyor support is raised, the cam followers are moved free of the channel 62, dashed lines in FIGURE 6, and the sprocket gear 20 is free to rotate as described hereinabove.

Several modifications will readily be apparent to those skilled in the art. Instead of a sprocket chain, a continuous transport belt or band of rubber or other material may be used. Also, instead of a fluid driven linear actuator, a pitman may be used for cyclically raising and lowering the conveyor structure. Further, the pins and trigger arm may be arranged to cause the incremental horizontal motion of the sprocket chain to occur during the initial portion of the downstroke of the piston instead of the final portion of the upstroke. Still further modifications may involve alternative mounting means for the conveyor and the means for providing lateral conveyor motion in response to vertical motion imparted to the conveyor.

What is claimed is:

1. A conveyor system for conveying articles incrementally along one axis while providing also motion for articles conveyed by said system along a second axis which is substantially normal to said first axis, comprising:
   support means for supporting a conveyor which is adapted to move about said support means principally along a first axis;
   motive means coupled to said support means for cyclically subjecting said support means to reciprocating motion along a second axis which is substantially normal to said first axis, and
   cam means coupled to said conveyor and operated responsive to said motive means imparting reciprocating motion to said support means for moving said conveyor about said support means along said first axis by a predetermined increment,
   whereby an article supported by said conveyor is cyclically moved in one direction along said second axis, moved incrementally along said first axis and moved in the opposite direction along said second axis.

2. A conveyor system for conveying articles incrementally along one axis while providing also motion for articles conveyed by said system along a second axis which is substantially normal to said first axis, comprising:
   a stationary support means;
   a conveyor support means adapted to support a conveyor mounted for reciprocating motion relative to said stationary support means;
   a conveyor including an endless band movable about a set of spaced wheels supported by said conveyor support means, whereby when said endless band is moved about said wheels an article supported by said conveyor is transported principally along one axis;

motive means coupled between said stationary support means and said conveyor support means for cyclically imparting reciprocating motion to said conveyor support means along a second axis which is substantially normal to said first axis, and means for transforming linear motion to rotating motion coupled between said conveyor and said stationary support means for providing incremental motion of said conveyor along said one axis responsive to said motive means imparting reciprocating motion to said conveyor support means.

3. A conveyor system as set forth in claim 2 wherein said means for transforming linear motion to rotating motion comprises a wheel coupled to said set of spaced wheels and having a set of pins, and a cam surface disposed for engaging one of said pins during the reciprocating motion of said conveyor support means, whereby to cause said band to be moved incrementally about said set of spaced wheels.

4. A conveyor system as set forth in claim 2 wherein said motive means comprises a fluid operated actuator controlled by a timing device.

5. A conveyor system as set forth in claim 2 wherein said first axis is disposed generally in a horizontal direction and said second axis in a vertical direction.

6. A conveyor system as set forth in claim 2 wherein said motive means comprises a fluid operated actuator which constitutes the sole driving means for causing motion of said conveyor along two axes.

7. A conveyor as set forth in claim 2 wherein said endless band is a sprocket chain and said set of spaced wheels is a pair of sprockets, said means for transforming linear motion to rotating motion comprises a further wheel coupled to at least one of said sprockets and having a set of circularly spaced pins; and stationary cam means disposed for engaging one of said pins during the reciprocating motion of said conveyor support means, whereby to cause incremental rotation of said further wheel.

8. A conveyor system for conveying articles incrementally along one axis while providing also motion for articles conveyed by said system along a second axis which is substantially normal to said first axis, comprising:

a stationary support means;

a conveyor support adapted to support a conveyor mounted for reciprocating vertical motion relative to said stationary support means;

a conveyor including an endless band movable about a set of generally horizontally spaced wheels for transporting articles along a generally horizontal axis supported by said conveyor support means;

said band including spaced workpiece support means for dependingly supporting therefrom workpieces which, responsive to the motion of said band about said spaced wheels, are transported in a generally horizontal direction;

motive means coupled between said stationary support means and said conveyor support means for imparting a vertical reciprocating motion to said conveyor support means and thereby to said conveyor;

guide means disposed between said stationary support means and said conveyor support means for guiding said conveyor support means along its vertical motion;

a control means coupled to said motive means for cyclically energizing said motive means;

a wheel having a set of projecting pins coupled to said conveyor band;

a substantially stationary trigger arm disposed to engage one of said pins during the upper portion of the vertical excursion of said conveyor to cause an incremental motion of said wheel and band as the conveyor support means continues along its vertical reciprocating motion responsive to the operation of said motive means, whereby to cause a workpiece supported by said workpiece support means to be lifted and lowered along a vertical axis and, while being lifted, also moved incrementally along a generally horizontal axis relative to said stationary support means.

9. A conveyor system as set forth in claim 8 wherein said pins are disposed on a circle, 90 degree spaced from one another.

10. A conveyor system as set forth in claim 9 wherein said trigger arm occupies generally a horizontal position, one of said pins is caused to strike against a surface of said arm and, while being retained thereat, said wheel is forced into rotation responsive to the continuing vertical excursion of said conveyor support means, said arm includes means for retaining one of said pins during a portion of the vertical excursion of said conveyor support means in one direction and permitting passage of a rotated pin during the excursion of the conveyor support means in the opposite direction.

11. A conveyor system as set forth in claim 10 wherein said arm is mounted for limited pivotal motion so as to respectively intercept and permit passage of respective pins.

12. A conveyor system as set forth in claim 8 wherein an array of juxtaposed tanks is disposed underneath said conveyor whereby a workpiece depending from said workpiece support means is adapted to be sequentially transported from one tank to an adjacent tank, the initial vertical motion of said conveyor support means is sufficient to free a workpiece from a tank and any liquid contained therein, the subsequent combined vertical and horizontal motion effective upon the workpiece responsive to the continuing vertical motion of said conveyor support means and the incremental rotation of said wheel causes the workpiece to move along a resulting horizontal and vertical direction, and finally the workpiece is lowered into the adjacent tank.

13. A conveyor system as set forth in claim 8 and including means for blocking motion of said band about said spaced wheels when said conveyor support is disposed in the lower portion of its vertical reciprocating motion.

14. A conveyor system as set forth in claim 13 wherein said means for blocking motion comprises a stationary surface adapted to abut a set of said pins.

References Cited

UNITED STATES PATENTS 3,228,364 1/1966 Kremer et al. _____ 198—135 X
3,301,418 1/1967 Davis _____ 198—19 X EVON C. BLUNK, Primary Examiner.

MATTHEW L. AJEMAN, Assistant Examiner.

U.S. Cl. X.R.

198—135, 203; 214—89